United States Patent
Patricio et al.

(10) Patent No.: US 11,416,692 B2
(45) Date of Patent: Aug. 16, 2022

(54) METHOD FOR DISTINGUISHING BETWEEN ACTIVE AND PASSIVE CONTACTLESS DEVICES, AND CORRESPONDING READER

(71) Applicant: STMicroelectronics Austria GmbH, Graz (AT)

(72) Inventors: Gustavo Jose Henriques Patricio, Graz (AT); Oliver Regenfelder, Graz (AT); Ulrich Herrmann, Graz (AT); Thomas Poetscher, Deutschfeistritz (AT)

(73) Assignee: STMICROELECTRONICS AUSTRIA GMBH, Graz (AT)

( * ) Notice: Subject to any disclaimer, the term of this patent is extended or adjusted under 35 U.S.C. 154(b) by 0 days.

(21) Appl. No.: 17/332,405

(22) Filed: May 27, 2021

(65) Prior Publication Data
US 2021/0374365 A1   Dec. 2, 2021

(30) Foreign Application Priority Data

May 28, 2020   (EP) .................................... 20177247

(51) Int. Cl.
*G06K 7/10* (2006.01)
*G06K 19/07* (2006.01)
*H04B 5/00* (2006.01)

(52) U.S. Cl.
CPC ..... *G06K 7/10297* (2013.01); *G06K 19/0723* (2013.01); *H04B 5/0031* (2013.01); *H04B 5/0062* (2013.01)

(58) Field of Classification Search
CPC .......... G06K 19/0723; G06K 7/10297; H04B 5/0031; H04B 5/0062
See application file for complete search history.

(56) References Cited

U.S. PATENT DOCUMENTS

| 4,646,295 A | * | 2/1987 | Basile | .................. H04M 9/027 |
|---|---|---|---|---|
| | | | | 370/488 |
| 2010/0148931 A1 | * | 6/2010 | Pappu | .................. G06K 7/0008 |
| | | | | 340/10.2 |
| 2017/0373726 A1 | * | 12/2017 | Nakano | .................... H04L 1/08 |

FOREIGN PATENT DOCUMENTS

| JP | 2009065514 A | 3/2009 |
|---|---|---|
| WO | 2021102725 A1 | 6/2021 |

* cited by examiner

*Primary Examiner* — Omer S Khan
(74) *Attorney, Agent, or Firm* — Slater Matsil, LLP

(57) ABSTRACT

An embodiment method comprises transmitting a reader carrier signal from a contactless reader to a contactless device, receiving by the reader, a device modulated carrier signal from the device, the device modulated carrier signal having a carrier frequency, preferably turning off by the reader, the transmission of the reader carrier signal during reception of the device modulated carrier signal, and after having turned off the transmission of the reader carrier signal, determining by the reader the presence or the absence at the reader's antenna of a modulated carrier signal having at the reader's antenna the carrier frequency with a tolerance, without relying on the data content of the modulated carrier signal.

12 Claims, 7 Drawing Sheets

Passive Card

ALM enabled device

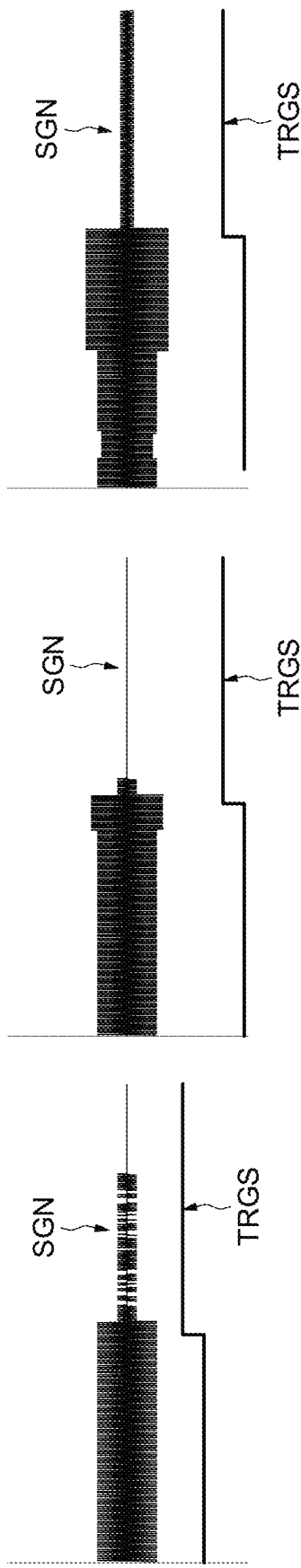
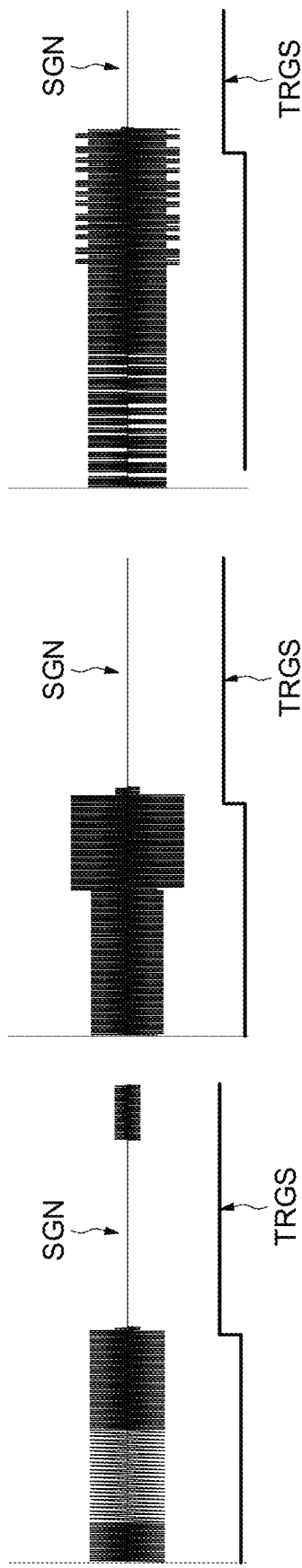

METHOD FOR DISTINGUISHING BETWEEN ACTIVE AND PASSIVE CONTACTLESS DEVICES, AND CORRESPONDING READER

CROSS-REFERENCE TO RELATED APPLICATIONS

This application claims the benefit of European Patent Application No. 20177247.2, filed on May 28, 2020, which application is hereby incorporated herein by reference.

TECHNICAL FIELD

Embodiments of the invention relate to the field of contactless communication, for example near field communication (NFC), and more particularly to identification of the type passive or active of NFC devices by an NFC reader.

BACKGROUND

Near field communication, better known to those skilled in the art under the name NFC (Near Field Communication), is a wireless connectivity technology that allows communication over a short distance, for example 10 cm, between electronic devices, such as contactless smart cards or labels or mobile devices, and readers.

NFC technology is particularly suitable for connecting any type of user device and allows for quick and easy communications.

A contactless device is a device capable of exchanging information via an antenna with a contactless reader, according to a contactless communication protocol.

An NFC device, which is a contactless device, is a device compatible with NFC technology.

NFC technology is an open standard technology platform in ISO/IEC 18092, ISO/IEC 21481, NFC Forum and EMVCo but incorporates many existing standards such as the Type A and Type B protocols defined in ISO-14443 or FeliCA JIS X6319-4 (type F) which are communication protocols that can be used in NFC technology.

Contactless technology can also be used in Radio Frequency IDentification (RFID) devices compatible with ISO 15693 and ISO 18000-3.

When transmitting information between a reader and a device, the reader generates a magnetic field via its antenna which is, generally in the standards conventionally used, a sine wave (the carrier) at 13.56 MHz.

To transmit information from the reader to the device, the reader uses an amplitude modulation of the carrier.

The device comprises a processer configured to demodulate the received carrier in order to obtain the data transmitted from the reader.

For an information transmission from the device to the reader, the reader generates the magnetic field (the carrier) without modulation.

The device antenna then modulates the field generated by the reader, according to the information to be transmitted. The frequency of this modulation corresponds to a subcarrier of the carrier. The frequency of this subcarrier depends on the communication protocol used and can be for example equal to 848 kHz.

This modulation is performed by modifying the load connected to the terminals of the device antenna.

Two modes of operation are then possible, a passive mode or an active mode.

In the passive mode, the device retro-modulates the wave coming from the reader to transmit information and does not integrate, for the transmission of information, a transmitter themselves, or emitters, capable for example of generating its own magnetic field during the broadcast. Such a device devoid of a transmitter is called passive device, as opposed to an active device which includes a transmitter.

Generally a passive device is devoid of power because it uses the wave from the reader to power its integrated circuit.

Such a "passive" device may also be designated by the expression "passive load modulation device."

In the active mode of operation, both the reader and the active device generate an electromagnetic field. Generally, this mode of operation is used when the active device is provided with a power source, for example a battery.

Each of the NFC devices (reader and device) transmits the data using a modulation scheme. Here again, the modulation results in an effect similar to load modification and this is then referred to as active load modulation (ALM) communication.

Compared to a passive communication mode, larger operating distances of up to 20 cm are obtained depending on the protocol used.

Moreover, the use of active load modulation makes it possible to use very small antennas.

ALM needs to be used in case signal generated by passive load modulation is not strong enough to be detected by a reader. This is the case when device's antenna is small or located in a challenging environment.

"active" device may also be designated by the expression "active load modulation device."

Most NFC enabled devices (e.g., mobile phones, smart watches) include a mode where they perform Card Emulation (CE). When in CE, the device must behave equivalent to a passive NFC card/tag.

Due to wide disparity of devices in the market no appropriate method exists to distinguish between a passive NFC tag and an active NFC enabled device performing in CE.

Recently more and more NFC enabled devices have employed Active Load Modulation (ALM) to boost the communication performance when in CE mode.

The ability to identify that a device is performing ALM can be used to distinguish NFC enabled devices from real passive NFC tags.

In certain applications it is important to be able to detect whether NFC communication is taking place with an NFC enabled device like a mobile phone or with a real passive NFC tag.

One example application is wireless charging like Qi. A Qi charger can destroy passive NFC tags, and therefore it should scan for passive NFC tags before starting any charging operation.

But NFC enabled phones cannot always be distinguished from NFC passive cards and a Qi charger may run in a situation where an NFC mobile phone that should be charged is erroneously detected as passive card and the Qi charging does not start.

Many conventional solutions exist for distinguishing between passive or active NFC devices.

A first solution may be based on the feature of a random UID.

More precisely, ISO14443/NFC Forum foresees an indicator on the UID (Unique Identification) when a randomly generated UID is used, which is sometimes used by mobile phones.

However random UID is not only used by NFC enabled devices, but also by some passive cards like passports, especially in situations where tracking of people has to be prevented.

Therefore a random UID cannot be used as a sure indication for an NFC enabled device.

Another solution may be based on multi-protocol support.

More precisely, most passive tags only support one NFC communication mode, while many NFC enabled devices support multiple NFC communication modes. With special polling techniques an NFC reader can identify whether a device supports multiple protocols.

But NFC enabled device manufacturers have a lot of freedom in their NFC implementation.

Therefore there are products in the market which are NFC enabled devices but only support a single NFC protocol.

Also there are a few passive NFC cards that support more than one protocol.

Hence multiprotocol support is also not a good way to distinguish NFC enabled devices from passive NFC cards.

Another solution is proposed in PCT/CN2019/121170 filed on Nov. 27, 2019.

According to this PCT application, a carrier signal and an interrogation signal are transmitted from an NFC reader and the reader receives a portion of an identification signal from an NFC device responsive to the interrogation signal.

The method according to this prior art includes reducing an amplitude of the carrier signal or ceasing to transmit the carrier signal for a selected duration after receiving the portion of the identification signal and prior to receiving an entirety of the identification signal. The reader detects whether the NFC device continues to transmit the identification signal during the selected duration. The reader can determine whether the NFC device is an active NFC device or a passive NFC device based on the determination of the data content of the received signal to determine whether the identification signal continues while the amplitude of the carrier signal is reduced or the transmission of the carrier signal has ceased.

In other words this existing solution relies on the reception of a good response (good data content) from the NFC enabled device once the carrier field has been strongly reduced or has disappeared.

But whether the carrier field disappears or is reduced, this solution relies on proper or correct data reception and requires accordingly a processing, including a demodulation, of the signal received from the NFC device to obtain the received data and to check that this data is correct.

There is thus a need to provide a simpler solution to detect at a reader a passive or active NFC device, while reducing the risk of false detection.

SUMMARY

According to an embodiment, a new method is proposed to distinguish NFC enabled devices using ALM from passive cards/tags.

The method according to this embodiment works by preferably turning off the reader carrier field completely during a transmission from the NFC device.

However, reducing the reader carrier field is also possible.

An NFC enabled device using ALM will continue to transmit its own carrier signal for some time after the field is turned off or reduced.

This continued transmission is detected on a basic physical signal level by detecting the presence of an external carrier with about 13.56 MHz frequency. This detection may be supported by various hardware features present in NFC reader products.

Thus, according to an aspect a method is proposed, comprising transmitting a reader carrier signal from a contactless reader, for example a near field communication-NFC-reader, to a contactless device, for example a NFC device, receiving by the reader, a device modulated carrier signal from the contactless device, the device modulated carrier signal, turning off by the reader, the transmission of the reader carrier signal or reducing by the reader the level of the reader carrier signal during reception of the device modulated carrier signal, and after having turned off the transmission of the reader carrier signal or after having reduced the level of the reader carrier signal, determining by the reader an indication related to a level of a signal at the reader's antenna.

When a level reduction is used, the level of the reader carrier signal or the reader carrier field is sufficiently reduced for passive devices not to be able to operate/modulate.

One skilled in the art will be able to choose the amount of this reduction according to the envisaged application and/or the type or types of passive devices used.

However a reduction of at least 80%, preferably at least 95%, of the level of the reader carrier signal with respect to a nominal level, appears to be sufficient for passive devices not to be able to operate/modulate.

The device modulated carrier signal sent by the device before turning off the transmission of the reader carrier signal or before reducing the level of the reader carrier signal, has a carrier frequency, for example 13.56 MHz.

And according to an embodiment, the signal whose level is to be determined has also at the reader's antenna the carrier frequency with a tolerance.

For example the tolerance may be some percent, in particular up to 8%, for example about 5 percent, of the carrier frequency.

If the device is an active device, this signal present at the reader's antenna and having the carrier frequency, is modulated, and the frequency of the modulation, for example 848 kHz, corresponds to a sub-carrier.

Determining the level indication, regardless of data content of the signal, permits to detect in a simple and reliable way, the presence or the absence of the signal at the reader's antenna, i.e., the eventual presence of a received signal emitted by an active device or the eventual absence of such received signal if the device is a passive device, after the transmission of the reader carrier signal has been turned off or the reduction of the level of reader carrier signal.

The method according to this aspect does not require correct selection of a reduced carrier strength and does not rely on proper data reception. It works by turning off the reader carrier completely or by reducing the level of reader carrier signal and by detecting the presence or the absence of ALM signal on physical level, without relying on the data content of the ALM signal (without performing any analysis or any check of the data content, i.e., regardless of the data content). It is thus easier to implement in customer systems and permits a more reliably detection of ALM signals.

Thus according to another aspect, a method is proposed, comprising transmitting a reader carrier signal from a contactless reader to a contactless device, receiving by the reader, a device modulated carrier signal from the device, the device modulated carrier signal having a carrier frequency, turning off by the reader, the transmission of the reader carrier signal or reducing by the reader the level of reader carrier signal during reception of the device modulated carrier signal, and after having turned off the transmission of the reader carrier signal or after having reduced the level of reader carrier signal, determining by the reader the presence or the absence at the reader's antenna of a modulated carrier signal having at the reader's antenna the carrier frequency with a tolerance, without relying on the data content of the modulated carrier signal.

The device is an active load modulation device in case of the presence of the modulated carrier signal.

The device is a passive load modulation device in case of the absence of the modulated carrier signal.

According to an embodiment, the determining step comprises, for determining the presence or the absence of the modulated carrier signal, determining by the reader an indication related to a level of the signal present at the reader's antenna.

Turning off the transmission of the reader carrier signal or reducing the level of reader carrier signal, may advantageously occur during reception of a frame of the received device modulated carrier signal, for example during reception of an identification signal from the device.

The interruption of transmission of the reader carrier signal or the reduction of the level of reader carrier signal, may last for an interruption or reduction duration, for example between few microseconds and several milliseconds.

Thus according to an embodiment, the determination of the level indication, may take place during a detection duration, which can be smaller than or equal to the interruption or reduction duration.

According to an embodiment, the method further comprises determining whether the contactless device is an active load modulation device based on whether the level indication is greater than a first threshold.

According to an embodiment, the method further comprises determining whether the contactless device is a passive load modulation device based on whether the level indication is lower than a second threshold.

The second threshold may be equal to the first threshold (equivalent to the use of a single threshold) but may be also smaller than the first threshold.

Many solutions are possible for determining the level indication. And the values of the first and second thresholds may depend from the used solution.

For example, determining the indication related to the level of the signal may comprise performing a down transposition into a base band (i.e., around 0 MHz), of the signal present at the antenna of the reader after having turned off the transmission of the reader carrier signal or after having reduced the level of the reader carrier signal, and determining a strength indication (RSSI) of the baseband signal.

The thresholds may be also derived from previous communication (dynamic threshold definition) with contactless devices.

Tests have been performed with existing passive devices incorporating integrated circuits of the family designated by ST25R391x at STMicroelectronics and a set of modern NFC enabled mobile phones to find the best approach for ALM detection Results indicate that a RSSI based ALM detection is able to reliably identify most tested devices, and improves correct detection rate over existing solutions.

According to another possibility, determining the indication related to the level of the signal may comprise detecting by a field detector of the reader the presence or the absence of an electromagnetic field at the antenna of the reader, after having turned off the transmission of the reader carrier signal or after having reduced the level of the reader carrier signal.

More particularly, NFC readers have an external field detector, which is normally used to detect the presence of another reader field close by. This feature is required to perform RF collision avoidance as mandated by various NFC standards. This external field detector can be armed when the reader carrier is turned off or reduced, and will then detect the presence of the ALM signal field generated by the phone.

Detecting the presence or the absence of a RF electromagnetic field with about the carrier frequency (for example 13.56 MHz) gives an indication of the level of an eventual signal received at the antenna of the reader.

And with such an embodiment, the strength of the electromagnetic field may be compared to the first threshold and the second threshold.

According to another possibility, determining the indication related to the level of the signal may comprise performing an amplitude measurement of the signal present at the antenna of the reader after having turned off the transmission of the reader carrier signal or after having reduced the level of the reader carrier signal.

More particularly, NFC readers can measure the RF amplitude of the carrier it generates.

This system can also be used to measure the amplitude of an external carrier like the ALM signal.

An RF amplitude measurement is triggered right after the carrier is turned off or reduced and a measurement result that indicates presence of a carrier signal shows that an ALM signal is present.

In other words, here the RF amplitude may be compared to the first threshold and the second threshold.

The thresholds may depend on RF amplitude measurement resolution.

According to another aspect, a contactless reader, for example a NFC reader, is proposed comprising a transmitter configured to transmit a reader carrier signal to a contactless device, for example a NFC device, a receiver configured to receive a device modulated carrier signal from the device, a controller configured to control the transmitter to turn off the transmission of the reader carrier signal or to reduce the level of the reader carrier signal during reception of the device modulated carrier signal, and a detection unit configured to determine, after the transmission of the reader carrier signal has been turned off or the level of the reader carrier signal has been reduced, an indication related to a level of a signal at the reader's antenna.

According to an embodiment, the detection unit comprises a transposition unit configured to perform a down transposition into a base band, of the signal present at the antenna of the reader after having turned off the transmission of the reader carrier signal or after having reduced the level of the reader carrier signal, and a processing unit configured to determine a strength indication of the baseband signal.

According to an embodiment, the detection unit comprises a field detector configured to detect the presence or the absence of an electromagnetic field at the antenna of the reader, after having turned off the transmission of the reader carrier signal or having reduced the level of the reader carrier signal.

According to an embodiment, the detection unit comprises a measurement unit configured to perform an amplitude measurement of the signal present at the antenna of the reader after having turned off the transmission of the reader carrier signal or having reduced the level of the reader carrier signal.

According to an embodiment, the detection unit is further configured to determine whether the device is an active load modulation device based on whether the level indication is greater than a first threshold.

According to an embodiment, the detection unit is further configured to determine whether the device is passive load modulation device based on whether the level indication is lower than a second threshold.

According to another aspect, a contactless reader is proposed, comprising a transmitter configured to transmit a reader carrier signal to a contactless device, a receiver configured to receive a device modulated carrier signal from the device, the device modulated carrier signal having a carrier frequency, a controller configured to control the transmitter to turn off the transmission of the reader carrier signal or to reduce the level of the reader carrier signal during reception of the device modulated carrier signal, and a detection unit configured to determine, after the transmission of the reader carrier signal has been turned off or the level of the reader carrier signal has been reduced, the presence or the absence at the reader's antenna of a modulated carrier signal having at the reader's antenna the carrier frequency with a tolerance, without relying on the data content of the modulated carrier signal.

According to an embodiment, the detection unit is further configured to determine whether the device is an active load modulation device based on the presence of the modulated carrier signal.

According to an embodiment, the detection unit is further configured to determine whether the device is a passive load modulation device based on the absence of the modulated carrier signal.

According to an embodiment, the detection unit is configured to determine an indication related to a level of a signal present at the reader's antenna.

BRIEF DESCRIPTION OF THE DRAWINGS

Other advantages and features of the invention will appear in the detailed description below and in the appended drawings which are not limitative, in which:

FIGS. 3-8 illustrate disparate active load modulation behaviors on the antenna signal upon field suppression;

DETAILED DESCRIPTION OF ILLUSTRATIVE EMBODIMENTS

Figure 1:
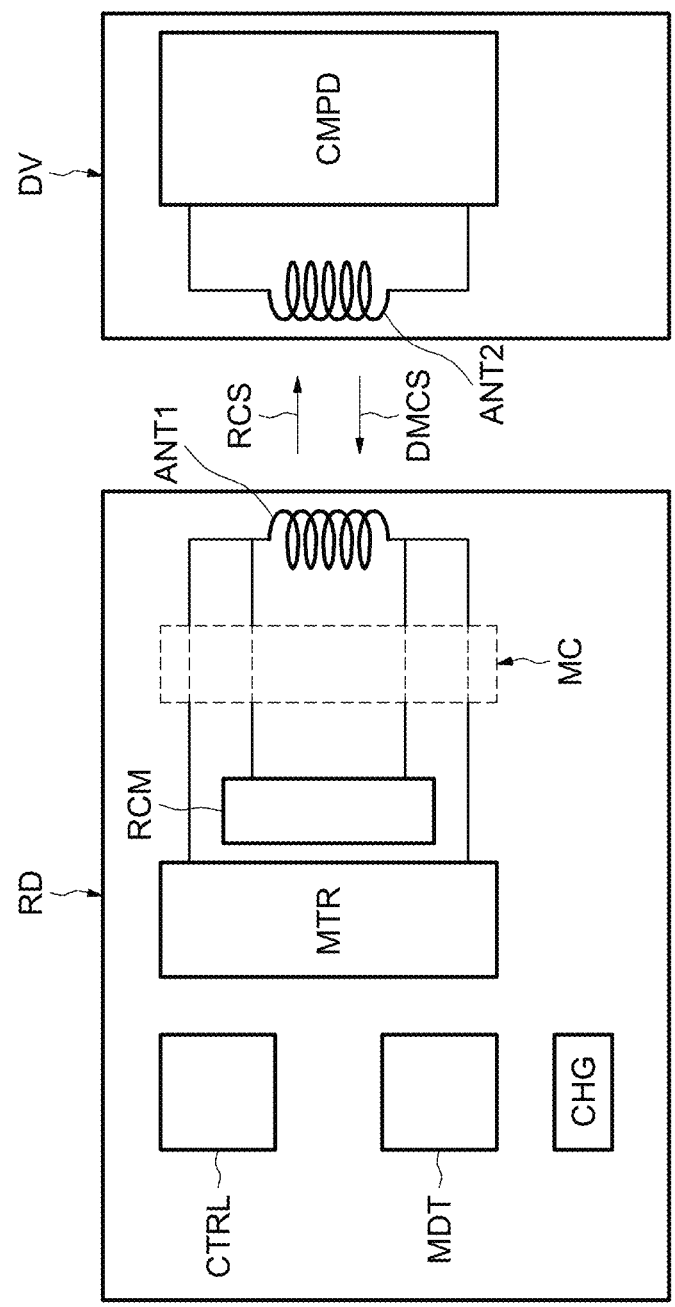
FIG. 1 illustrates a contactless system.

FIG. 1 illustrates diagrammatically a contactless system, for example an NFC or RFID, system, including a contactless reader, for example an NFC or RFID reader RD configure to exchange data with a contactless device DV, for example an NFC or RFID device, according to a contactless protocol.

The reader RD comprises transmitter MTR configured to transmit a reader carrier signal RCS, through an impedance matching circuit MC and an antenna ANT1, to the contactless device DV.

The reader carrier signal RCS has for example a carrier frequency equal to 13.56 MHz.

The reader comprises also receiver RCM connected to the impedance matching circuit MC and the antenna ANT1 and configured to receive a device modulated carrier signal DMCS from the device DV, the device modulated carrier signal DMCS having the carrier frequency (here 13.56 MHz) and a modulation frequency equal for example to 848 kHz.

The device DV comprises a component CMPD configured to generate the device modulated carrier signal DMCS for it to be transmitted through the device antenna ANT2.

If the device is a passive one, the component retromodulates the reader carrier signal RCS coming from the reader to transmit information and does not integrate, for the transmission of information, a transmitter themselves, or an emitter, capable for example of generating its own magnetic field during the broadcast.

Such a "passive" device may also be designated by the expression "passive load modulation device."

If the device is an active one, both the reader RD and the active device DV generate an electromagnetic field. In such a case the active device is provided with a power source, for example a battery.

Each of the reader and active device transmits the data using a modulation scheme of the corresponding generated electromagnetic field. Here again, the modulation results in a load modification and this is then referred to as active load modulation (ALM) communication.

Such an «active» "active" device may also be designated by the expression "active load modulation device."

The reader RD comprises also controller CTRL configured to control the transmitter MTR to turn off the transmission of the reader carrier signal RCS during reception of the device modulated carrier signal DMCS.

Many applications of NFC technology utilize an NFC reader to interrogate and receive data from an NFC device. The NFC reader typically outputs an interrogation signal. If an NFC device is within range of the interrogation signal, then the NFC device responds by providing an identification signal identifying the NFC device. After the NFC device has identified itself, the NFC reader and the NFC device can further exchange information.

Thus in a particular embodiment, the controller CTRL may control the transmitter for turning off during a frame of the received identification signal.

The reader comprises also detection unit MDT configured to determine, after the transmission of the reader carrier signal has been turned off, an indication related to a level of signal at the reader's antenna.

This searched signal has, at the reader's antenna, the carrier frequency (here 13.56 MHz) with a possible tolerance. This detection will permit to distinguish between a passive device DV or an active device DV.

Figure 2:
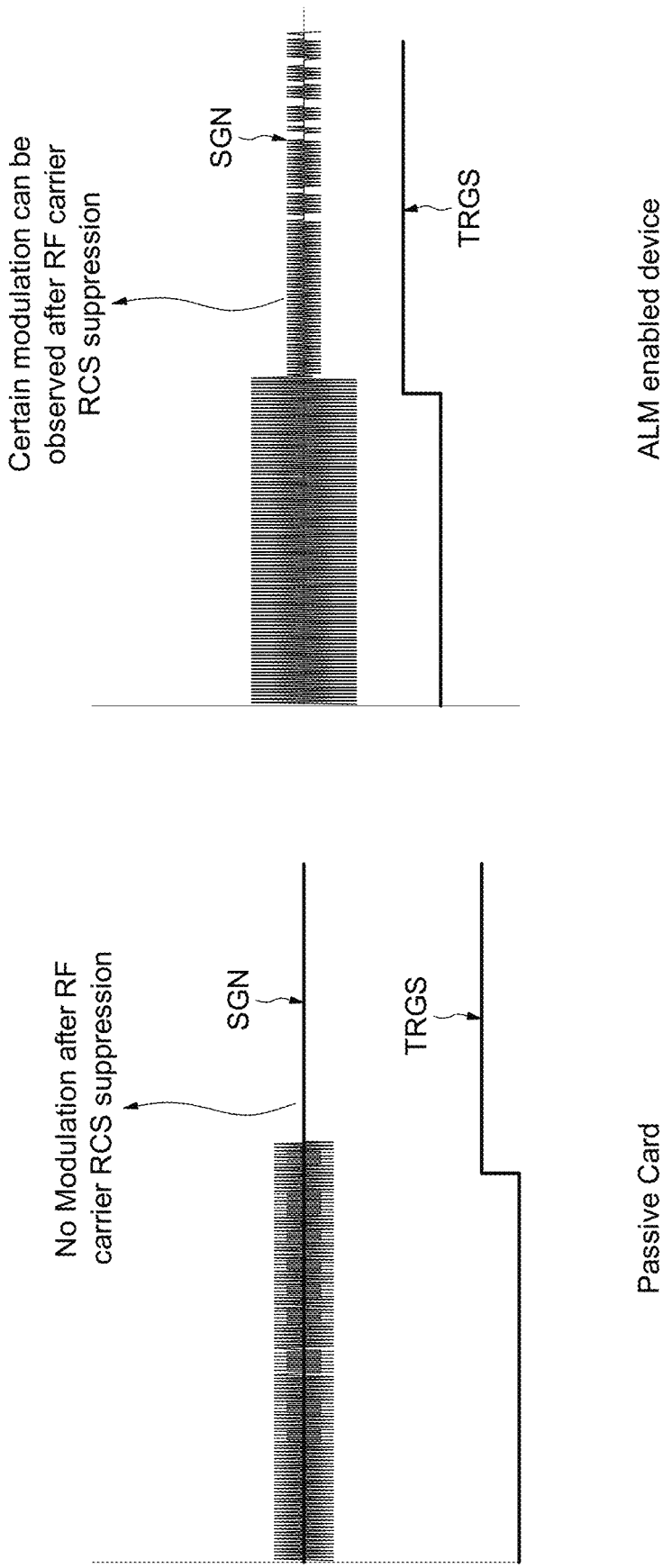
FIG. 2 illustrates modulation differences between passive and active devices.

As a matter of fact, as illustrated in FIG. 2, upon triggering the detection/sensing phase, corresponding to the logic state transition of a trigger signal TRGS generated by the controller, there is no modulation in the signal SGN present at the antenna ANT1 of the reader after suppression of the reader carrier signal RCS if the device DV is a passive one, for example a passive card (left part of FIG. 2) while there is a certain modulation (for example at a frequency equal to 848 kHz) in the signal SGN present at the antenna ANT1 of the reader after suppression of the reader carrier signal RCS if the device DV is an active one, for example an ALM enabled smartphone in the card emulation mode (right part of FIG. 2).

In other words there is no modulated carrier signal at the antenna ANT1 if the device DV is a passive one while there is a modulated carrier signal at the antenna ANT1, during a certain duration, if the device is an active one.

The presence or the absence of such modulated carrier signal permits to distinguish between a passive and active device without relying on the data content of the modulated carrier signal.

As a matter of fact, unlike passive cards, ALM devices are self-powered and the field suppression does not cause the device to shut down.

Each ALM implementation behaves different upon reader's field suppression during ongoing transmission.

Although behavior upon RF carrier synchronization loss is not defined, most ALM implementations continue to produce some sort of modulation after RF carrier suppression which can be used to determine the presence of ALM.

FIGS. 3 to 8 illustrate disparate ALM behaviors on the signal SGN upon field suppression (Signal TRGS at high state).

Figure 9:
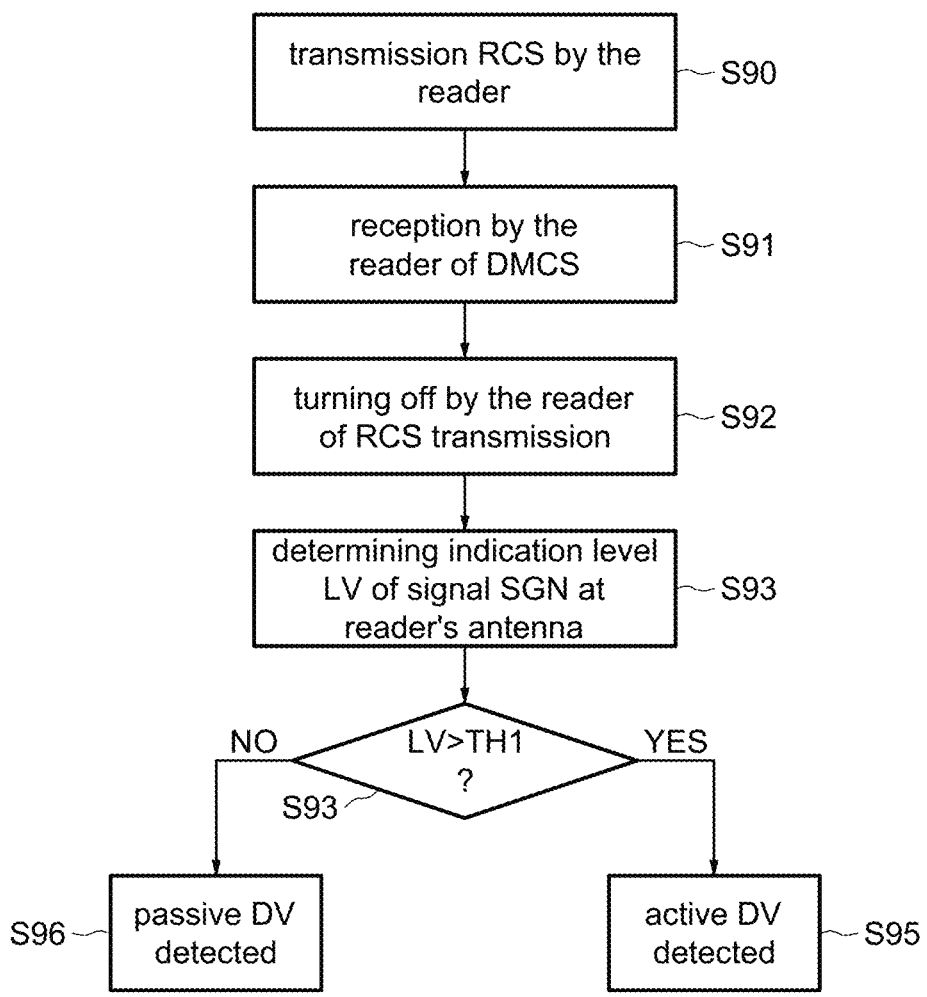
FIG. 9 illustrates a method for detecting a passive or active load modulation device.

We refer now more particularly to FIG. 9 which illustrates an embodiment of a method according to the invention.

In a step S90, the reader transmits the reader carrier signal RCS to the contactless device.

In a step S91, the reader receives the device modulated carrier signal DMCS, for example an identification signal, from the contactless device DV, the device modulated carrier signal DCMS having the carrier frequency, for example 13.56 MHz, and a modulation frequency, for example 848 kHz.

In step S92, the reader turns off the transmission of the reader carrier signal RCS during reception of the device modulated carrier signal DMCS.

In step S93, the reader determines, after having turned off the transmission of the reader carrier signal RCS, an indication LV related to a level of a signal SGN at the reader's antenna ANT1.

This searched signal SGN has the carrier frequency with a tolerance.

For example the tolerance may be some percent, for example about 5 percent, of the carrier frequency.

Turning off the transmission of the reader carrier signal may advantageously occur during reception of a frame of the received device modulated carrier signal, for example during reception of an identification signal from the device.

The interruption of transmission of the reader carrier signal may last for an interruption duration, for example between few microseconds and several milliseconds.

This interruption duration may be greater than or equal to the duration during which the level determination is performed.

According to an embodiment, the method further comprises in step S94 a comparison of the indication level LV to a threshold TH1.

In this embodiment, there is only one threshold.

If the indication level LV is greater than or equal to TH1, the device DV is detected as being an active load modulation device (S95).

If the indication level LV is smaller than TH1, the device DV is detected as being a passive load modulation device (S96).

Figure 10:
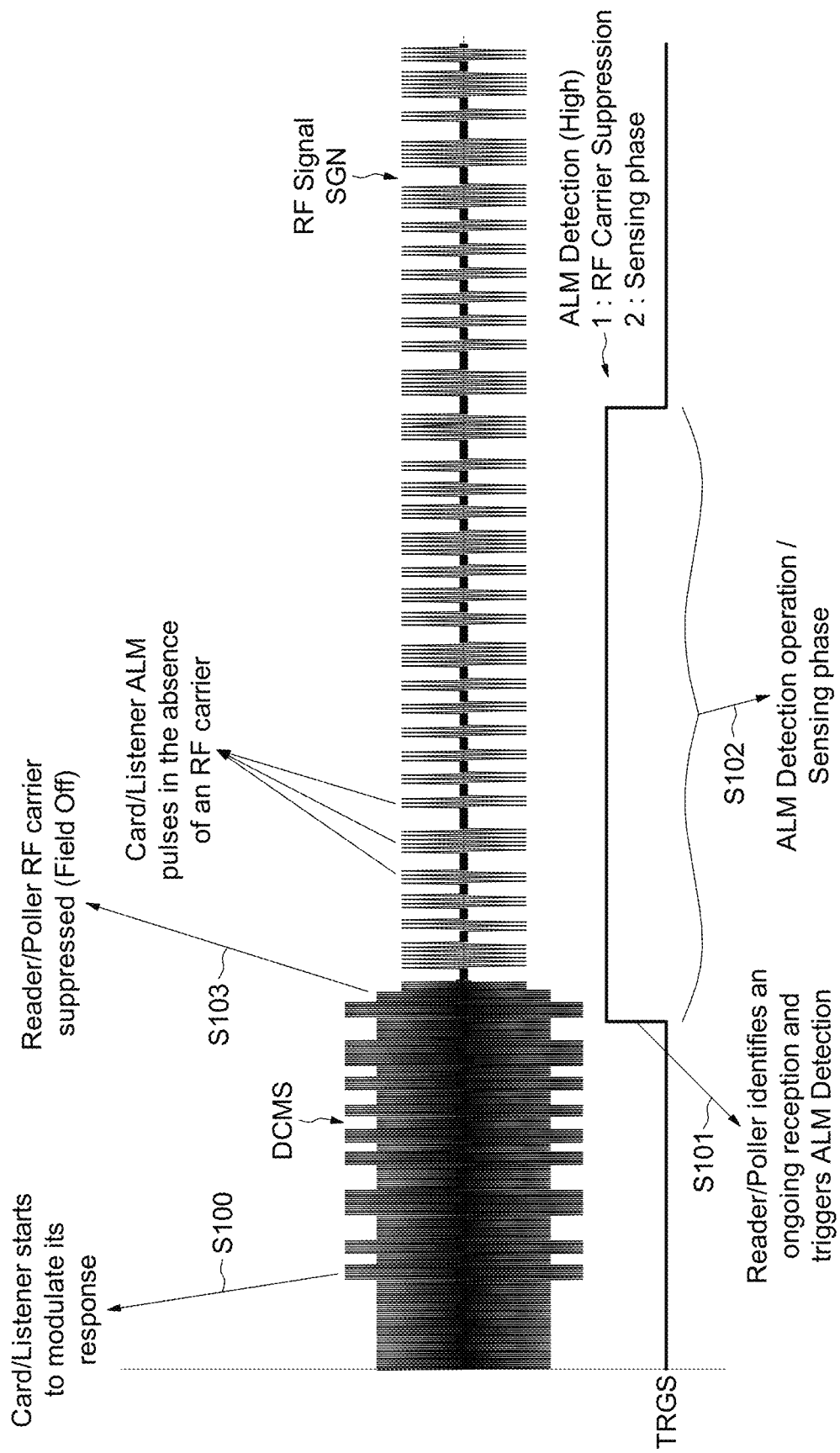
FIG. 10 illustrates example signal shapes for detection of an active device.

FIG. 10 illustrates example of signal shapes in case of a detection of an active device.

More precisely, in this example, the reader has sent the reader carrier signal RCS and has modulated it for transmitting for example an interrogation signal to the device.

In step S100 the device starts to modulate its response (identification signal for example) and sends accordingly the device modulated carrier signal DCMS having the carrier frequency, for example 13.56 MHz and a modulation frequency equal for example to 848 kHz.

In step S101 the reader identifies an ongoing reception of the device modulated carrier signal DCMS and triggers the detection process of the type of device (trigger signal TRGS takes a high state).

This is the beginning of detection process S102.

In step S103, the reader suppresses the reader carrier signal RCS and will determine the level indication of the signal SGN present at the reader's antenna.

As in the present example, the device is an active device, the signal SGN has the carrier frequency (13.56 MHz) and comprises ALM pulses (at the modulation frequency, for example 848 kHz) even in absence of the reader carrier signal RCS.

The level indication will be accordingly greater than the first threshold TH1, representative of an active device.

Figure 11:
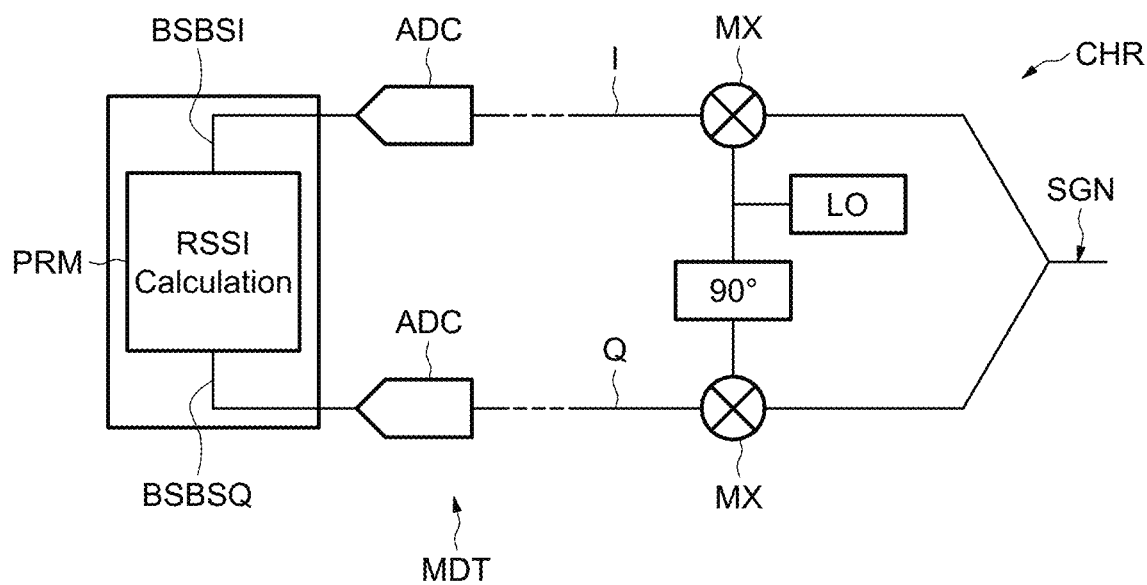
FIG. 11 illustrates a detection unit.
Figure 12:
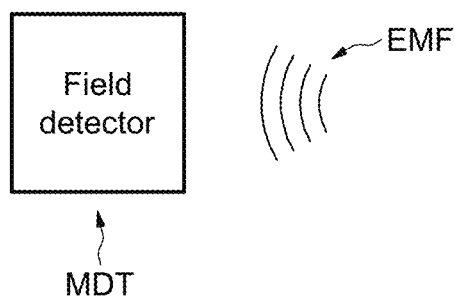
FIG. 12 illustrates a detection unit.
Figure 13:
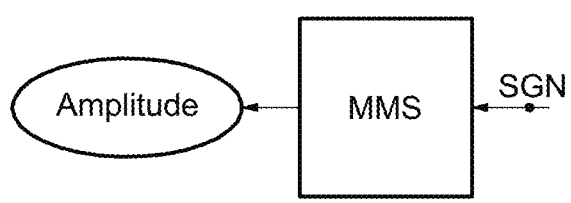
FIG. 13 illustrates a detection unit.

Many possibilities exist for implementing the detection unit MDT, as illustrated diagrammatically in FIGS. 11 to 13.

As illustrated in FIG. 11, the detection unit comprises transposition unit MX configured to perform in the reception chain CHR a down transposition into a base band, of the signal SGN present at the antenna of the reader after having turned off the transmission of the reader carrier signal.

More precisely, the mixers MX use as transposition signals an oscillator signal having the carrier frequency (13.56 MHz) issued from a local oscillator LO and the same oscillator signal but 90° phase shifted.

The two transposed signals on paths I and Q are then converted in analog to digital converters ADC to obtain the components BSBSI and BSBSQ of the digital baseband signal.

The detection unit MDT comprises a processing unit configured to determine a strength indication (RSSI) of the baseband signal.

The RSSI is then compared to the threshold TH1 which can be equal for example to 5 mVpp.

As illustrated in FIG. 12, the detection unit MDT may comprise a field detector, for example an external field detector, configured to detect the presence or the absence of an electromagnetic field EMF at the antenna of the reader, after having turned off the transmission of the reader carrier signal.

For determining the presence or the absence of the electromagnetic field, the level of the electromagnetic field is compared to the threshold TH1 which can be equal for example to 25 mVpp.

As illustrated in FIG. 13, detection unit MDT may comprise measurement unit MMS configured to perform an amplitude measurement of the signal SGN present at the antenna of the reader after having turned off the transmission of the reader carrier signal.

The amplitude is compared to the threshold TH1 which can be equal for example to 25 mVpp.

Figure 14:
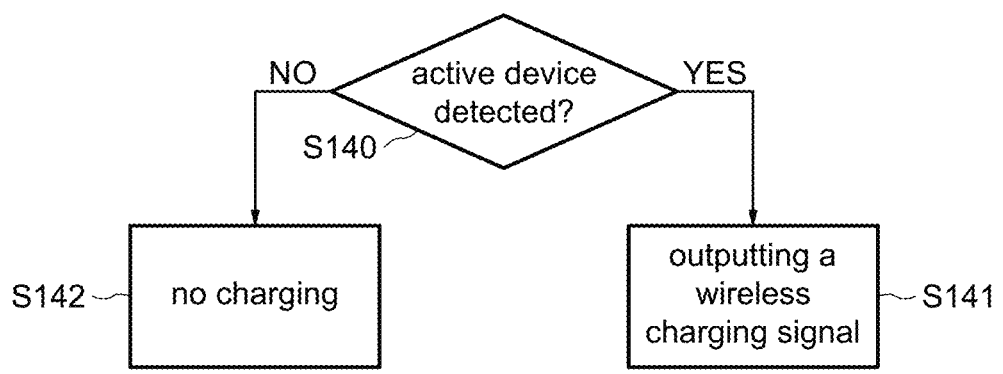
FIG. 14 illustrates an active device charging method.

As illustrated in FIG. 14, if in step S140, an active device is detected, the charging bay CHG of the reader can output a wireless charging signal to the active device (step S141), for example a charging signal according to the Qi standard.

Of course a charging application is not the sole application which can use the detection between passive and active contactless devices.

Access control or transportation systems could for example use ALM detection to dismiss cards emulated on easily accessible mobile phones.

Although in the above described embodiments, the ALM detection uses a turning off of the reader carrier signal, the advantages of other embodiments of the invention may be also obtained with a reduction of the level of the reader carrier signal or the reader carrier field chosen for passive devices not to be able to operate/modulate, for example a reduction of 95% with respect to a nominal level.

When a level reduction is used, the values of the different thresholds mentioned above are adapted for taking into account the residual level of the reduced reader carrier signal (reader carrier field).

What is claimed is:

1. A method comprising:
   transmitting a reader carrier signal from a contactless reader to a contactless device;
   receiving, by the reader, a device modulated carrier signal from the device, the device modulated carrier signal having a carrier frequency;
   turning off, by the reader, the transmission of the reader carrier signal, or reducing, by the reader, a level of the reader carrier signal, during reception of the device modulated carrier signal;
   after having turned off the transmission of the reader carrier signal or after having reduced the level of the reader carrier signal, determining, by the reader, a presence or an absence at an antenna of the reader of a second modulated carrier signal having at the antenna of the reader the carrier frequency with a tolerance, without relying on a data content of the second modulated carrier signal;
   determining whether the device is an active load modulation device based on the presence of the second modulated carrier signal; and
   determining whether the device is a passive load modulation device based on the absence of the second modulated carrier signal.

2. The method according to claim 1, wherein the determining comprises determining by the reader an indication related to a level of the second modulated carrier signal present at the antenna of the reader.

3. A method comprising:
   transmitting a reader carrier signal from a contactless reader to a contactless device;
   receiving, by the reader, a device modulated carrier signal from the device, the device modulated carrier signal having a carrier frequency;
   turning off, by the reader, the transmission of the reader carrier signal, or reducing, by the reader, a level of the reader carrier signal, during reception of the device modulated carrier signal;
   after having turned off the transmission of the reader carrier signal or after having reduced the level of the reader carrier signal, determining, by the reader, an indication related to a level of a second modulated carrier signal at an antenna of the reader;
   determining whether the device is an active load modulation device based on the level indication being greater than a first threshold; and
   determining whether the device is a passive load modulation device based on the level indication being lower than a second threshold.

4. The method according to claim 3, wherein determining the indication related to the level of the second modulated carrier signal comprises performing a down transposition to a baseband signal, of the second modulated carrier signal present at the antenna of the reader after having turned off the transmission of the reader carrier signal or after having reduced the level of the reader carrier signal, and determining a strength indication of the baseband signal.

5. The method according to claim 3, wherein determining the indication related to the level of the second modulated carrier signal comprises detecting by a field detector of the reader, a presence or an absence of an electromagnetic field at the antenna of the reader, after having turned off the transmission of the reader carrier signal or after having reduced the level of the reader carrier signal.

6. The method according to claim 3, wherein determining the indication related to the level of the second modulated carrier signal comprises performing an amplitude measurement of the second modulated carrier signal present at the antenna of the reader after having turned off the transmission of the reader carrier signal or after having reduced the level of the reader carrier signal.

7. A contactless reader comprising:
   a transmitter configured to transmit a reader carrier signal to a contactless device;
   a receiver configured to receive a device modulated carrier signal from the device, the device modulated carrier signal having a carrier frequency;
   a controller configured to control the transmitter to turn off the transmission of the reader carrier signal, or to reduce a level of the reader carrier signal during reception of the device modulated carrier signal; and
   a detection unit configured to:
      determine, after the transmission of the reader carrier signal has been turned off or after the reduction of the level of the reader carrier signal, a presence or an absence at an antenna of the reader of a second modulated carrier signal having at the antenna of the reader the carrier frequency with a tolerance, without relying on a data content of the second modulated carrier signal;
      determine the device is an active load modulation device based on the presence of the second modulated carrier signal; and
      determine the device is a passive load modulation device based on the absence of the second modulated carrier signal.

8. The reader according to claim 7, wherein the detection unit is configured to determine an indication related to a level of the second modulated carrier signal present at the antenna of the reader.

9. A contactless reader comprising:
   a transmitter configured to transmit a reader carrier signal to a contactless device;
   a receiver configured to receive a device modulated carrier signal from the device, the device modulated carrier signal having a carrier frequency;
   a controller configured to control the transmitter to turn off the transmission of the reader carrier signal or to reduce a level of the reader carrier signal during reception of the device modulated carrier signal; and
   a detection unit configured to:
      determine, after the transmission of the reader carrier signal has been turned off or after the reduction of the level of the reader carrier signal, an indication related to a level of a second modulated carrier signal at an antenna of the reader;

determine the device is an active load modulation device based on the level indication being greater than a first threshold; and determine the device is a passive load modulation device based on the level indication being lower than a second threshold.

10. The reader according to claim 9, wherein the detection unit comprises a transposition unit configured to perform a down transposition a baseband signal, of the second modulated carrier signal present at the antenna of the reader after having turned off the transmission of the reader carrier signal or after having reduced the level of the reader carrier signal, and a processing unit configured to determine a strength indication of the baseband signal.

11. The reader according to claim 9, wherein the detection unit comprises a field detector configured to detect a presence or an absence of an electromagnetic field at the antenna of the reader, after having turned off the transmission of the reader carrier signal or after having reduced the level of the reader carrier signal.

12. The reader according to claim 9, wherein the detection unit comprises a measurement unit configured to perform an amplitude measurement of the second modulated carrier signal present at the antenna of the reader after having turned off the transmission of the reader carrier signal or after having reduced the level of the reader carrier signal.

* * * * *